(No Model.) 3 Sheets—Sheet 1.

H. H. HUHN.
MACHINE FOR WEIGHING LIQUIDS.

No. 596,328. Patented Dec. 28, 1897.

Witnesses.
O. H. Keeney
Anna V. Faust

Inventor.
Henry H. Huhn
By Benedict and Morsell
Attorneys.

(No Model.) 3 Sheets—Sheet 2.
H. H. HUHN.
MACHINE FOR WEIGHING LIQUIDS.

No. 596,328. Patented Dec. 28, 1897.

Witnesses.
O. N. Keeney
Anna V. Faust

Inventor.
Henry H. Huhn
By Benedict and Morsell
Attorneys.

THE NORRIS PETERS CO., PHOTO-LITHO., WASHINGTON, D. C.

(No Model.)   3 Sheets—Sheet 3.
H. H. HUHN.
MACHINE FOR WEIGHING LIQUIDS.
No. 596,328.   Patented Dec. 28, 1897.
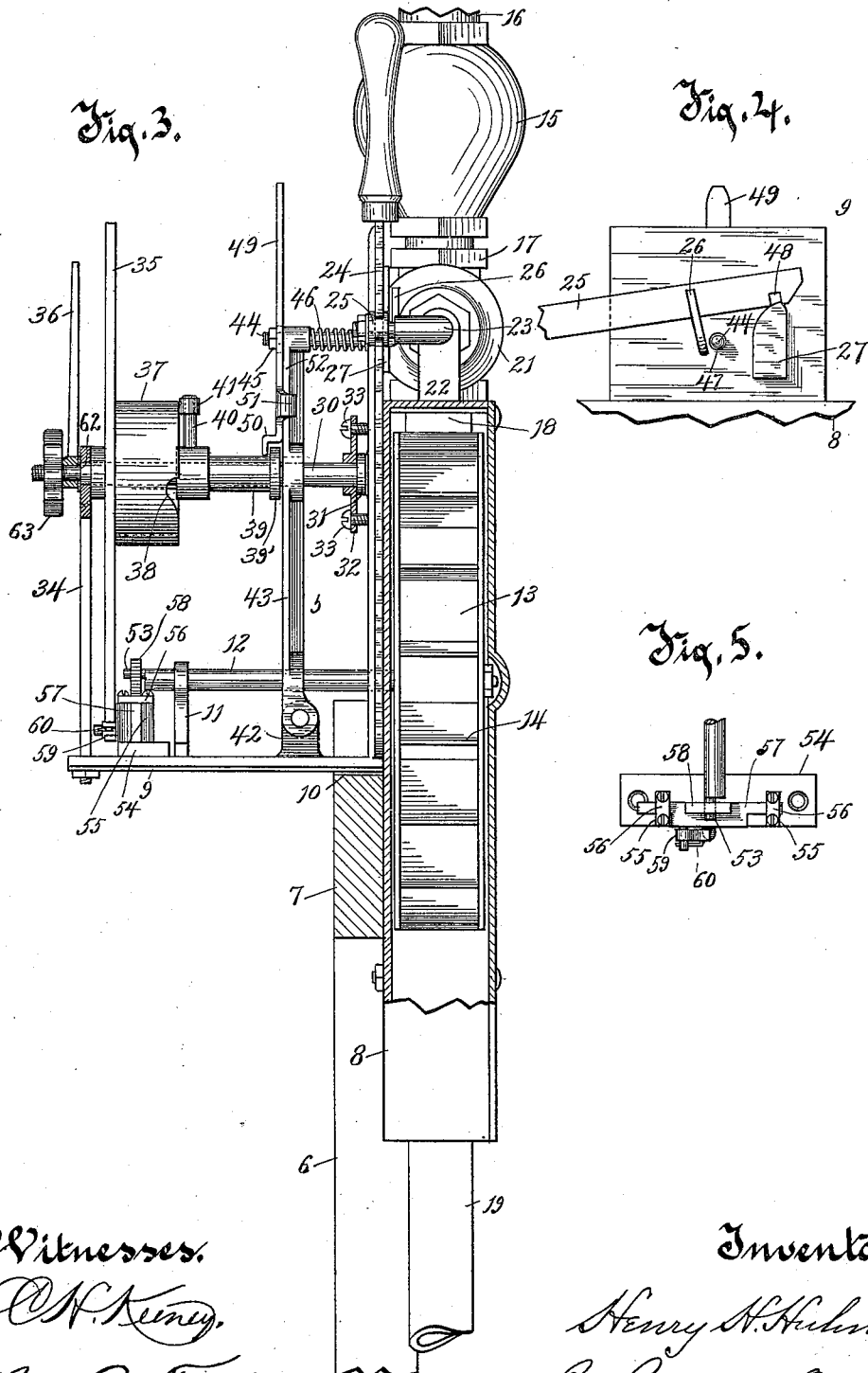
Witnesses.
O. H. Keeney.
Anna V. Faust.
Inventor.
Henry H. Huhn
By Benedict & Morsell
Attorneys.

UNITED STATES PATENT OFFICE.

HENRY H. HUHN, OF CATO, WISCONSIN.

MACHINE FOR WEIGHING LIQUIDS.

SPECIFICATION forming part of Letters Patent No. 596,328, dated December 28, 1897.

Application filed March 19, 1897. Serial No. 628,271. (No model.)

*To all whom it may concern:*

Be it known that I, HENRY H. HUHN, of Cato, in the county of Manitowoc and State of Wisconsin, have invented a new and useful Improvement in Machines for Weighing Liquids, of which the following is a description, reference being had to the accompanying drawings, which are a part of this specification.
My invention has relation to improvements in machines for weighing liquids, more especially intended for weighing skim-milk.

The object of the invention is to provide a construction which will secure absolute accuracy in weighing fluids, which is, furthermore, simple in construction, inexpensive of production, and most easily and expeditiously operated.

The invention will be found of especial utility in creameries, where it is customary to receive fresh milk daily from farmers and dairymen and to return to them in skim-milk a certain percentage of the amount of the fresh milk. This machine therefore is most advantageously used for weighing the amounts of skim-milk which are to be thus returned.

Having in view the above primary object, the invention consists of the devices and parts or their equivalents, as hereinafter more fully set forth.

Figure 1:
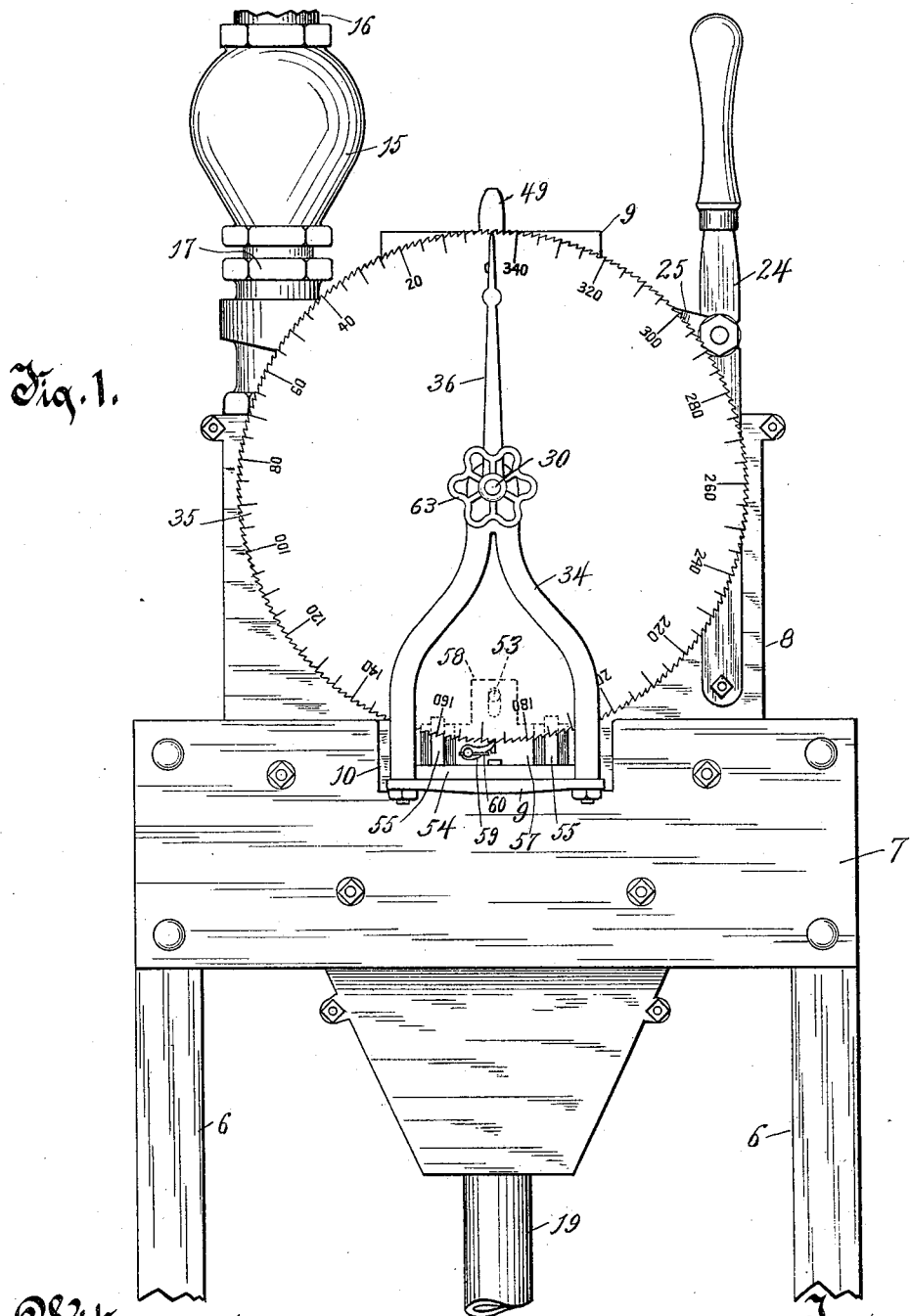
Figure 2:
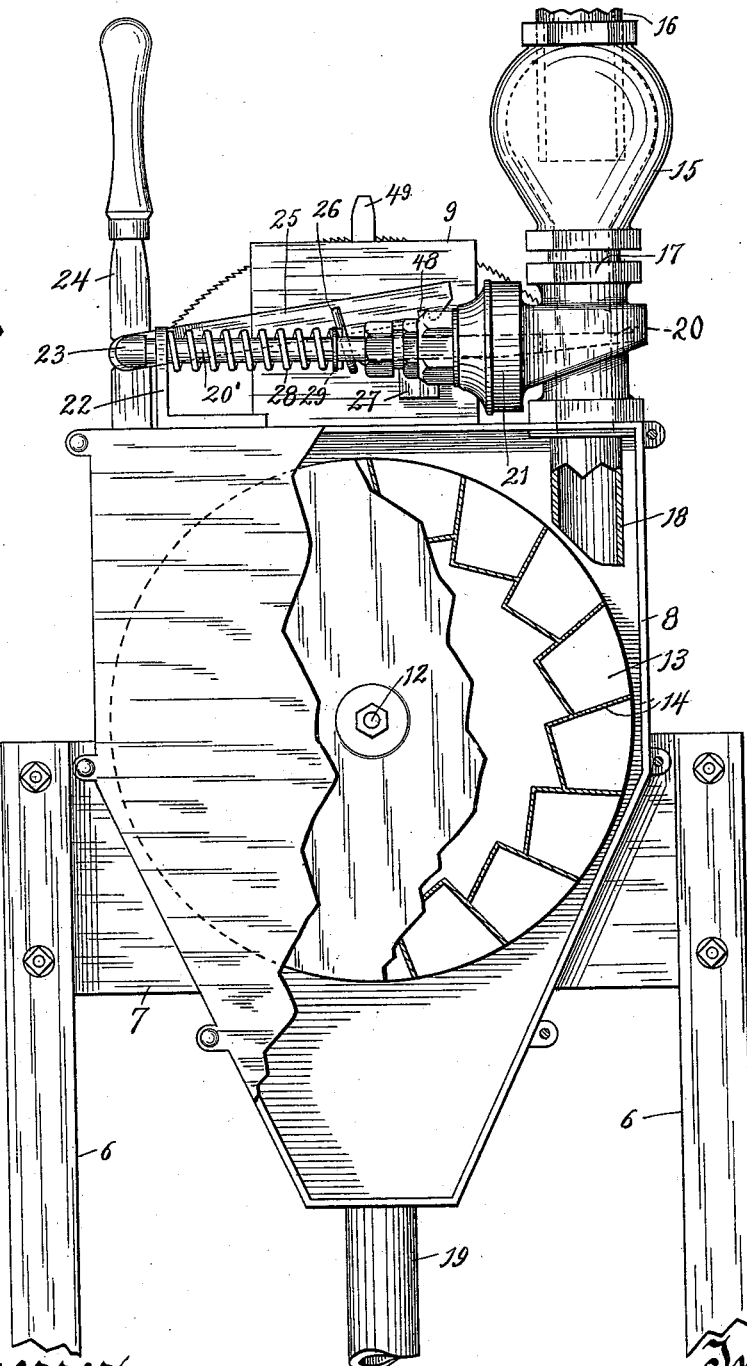

In the accompanying drawings, Figure 1 is a front elevation of the complete machine. Fig. 2 is a rear elevation with parts broken away. Fig. 3 is an edge view showing the case of the fluid-actuated wheel in section. Fig. 4 is a detail view showing more particularly the reciprocating arm and allied parts, and Fig. 5 is a detail view of the mechanism for operating the index-wheel.
The frame of the machine preferably consists of two uprights or standards 6 6 and a connecting top beam 7. Bolted or otherwise suitably secured to the rear side of this beam is a casing 8, advisably of the peculiar shape shown. The front side and the rim of this casing are preferably made integral, while the rear side is removable in order to afford ready access to the interior, when desired. To the front side of the casing is secured an angular casting 9, which extends down into a recess 10 in the top edge of the beam 7, the horizontal portion of the casting extending forwardly from the bottom of this recess. Extending up from this horizontal portion of the casting is a bearing 11, in which the forward end of a shaft 12 is journaled, said shaft extending rearwardly through the front side of the casing into said casing. A fluid-actuated wheel 13 is mounted upon the shaft within the casing, and this wheel is provided peripherally with a series of buckets 14.

Arranged above the casing is a reservoir 15, to which a pipe 16, extending from a suitable tank, (not shown,) leads, said pipe passing into the reservoir for a desired distance, as shown by dotted lines in Fig. 2. The lower outlet end of the reservoir is connected to a coupling 17, and to the lower end of this coupling, in turn, is connected a pipe 18, which pipe extends through the top of the casing into said casing for a desired distance, in order to discharge into the buckets of the fluid-actuated wheel. The lower end of this pipe is advisably beveled inwardly, so as to more effectually discharge the fluid into the respective buckets as said buckets are successively brought beneath the pipe. The lower end of the casing is provided with an outlet-opening, to which a discharge-pipe 19 is connected.

The interior coupling 17 forms a valve-chamber, and within this chamber is an ordinary form of flat slide-valve 20, which is operated by means of a valve-rod 20', which extends through a projection 21, forming a part of the coupling, and enters the valve-chamber to connect with or form a part of the sliding valve. The outer end of this rod passes through and is guided in an aperture formed in an angle-iron 22, secured to the top of the casing, the extremity of the rod being bent forwardly at right angles, as indicated at 23. This bent portion passes loosely through the upper end of a lever 24, said lever being pivoted at its lower end to the front side of the casing, and at its upper end being provided with a handle for convenience in operating it. The bent end of the valve-rod also passes loosely through the bifurcated end of a reciprocating arm 25, the furcate parts of said arm straddling the lever 24. It will be seen that the upper end of the vertical member of the angular casting 9 extends above the top of the casing of the fluid-actuated wheel, and projecting from the rear face of this upwardly-extending portion of the casting is an angle-arm 26, between which and the face of the casting the reciprocating arm 25 passes, said angle-arm thereby forming a guide for the reciprocating arm. The front edge of the reciprocating arm is beveled, and this beveled surface is adapted to ride over the beveled upper end of a lug or projection 27 from the casting, said lug or projection normally holding the free end of the reciprocating arm in a raised position, as clearly shown in Fig. 4, for the purpose hereinafter more fully explained. The valve-rod is encircled for the greater portion of its length by a coiled spring 28. The inner end of this spring bears against a collar 29 on the rod, while the outer end of the spring bears against the bearing 22.

The numeral 30 indicates a shaft, the rear end of which is provided with an enlargement 31. This shaft is adapted to be passed through the central opening of a plate 32, said plate being held to the vertical member of the casting 9 by means of screws 33 33, a space being thereby formed between the plate and the casting for the accommodation of the enlargement or head of the shaft. The plate therefore forms a bearing for the end of the shaft, while the enlargement prevents the shaft from longitudinal displacement in said bearing. The forward end of this shaft is journaled in an eye formed in the upper end of a bracket 34, extending upwardly from the outer end of the horizontal member of the casting 9. Mounted loosely on this shaft, near the outer end thereof, is an index-wheel 35, said wheel having a series of graduations or marks on one face thereof running from "0" to "340," the numbers having intervals of twenty therebetween. The periphery of this wheel is toothed, and there are advisably two hundred and eight of these teeth. Any desired scale and any desired number of teeth may of course be employed. Mounted fast on the shaft 30 is a pointer 36, which is adapted to be swung around the graduated face of the index-wheel. The inner face of the index-wheel is provided with a projecting hub 37, which at one point of its edge is provided with an indentation or recess 38. Surrounding the shaft 30 is a collar 39, said collar being feathered on the shaft, so as to rotate therewith and also to have a longitudinal movement thereon. The other end of the collar is enlarged somewhat, and projecting radially from this enlargement is an arm 40, said arm carrying at its extremity an antifriction-roller 41, which is adapted to bear against the edge of the hub 37 of the index-wheel. Pivoted to a lug 42, projecting upwardly from the horizontal portion of the angular casting 9, is a lever 43, which has an opening through which the shaft 12 passes and also another opening at a medial point for the passage therethrough of the shaft 30. The upper extremity of this lever is also provided with an eye through which the reduced threaded extremity of a bolt 44 passes. A nut 45 takes onto the reduced threaded portion of this bolt. The bolt is encircled by a coiled spring 46, which is confined between the lever and the vertical member of the angular casting 9, and the rear end of the bolt passes through an opening 47 in the upper extended end of the vertical portion of the angular casting 9, the extremity being preferably somewhat beveled in order to engage a recess 48, formed on the under edge of the reciprocating arm 25, near the free end of said arm. The reduced threaded end of the bolt 44 also passes through an opening in an operating-arm 49, the nut 45 clamping said arm against the lever 43. The lower end of the operating-arm is provided with an angular lug 50, which extends down in front of the enlargement 39' of the collar 39. The operating-arm is also provided at opposite edges near its lower end with angular lugs 51, which are adapted to engage flanges 52, extending from the lever 43. While I prefer to employ this operating-arm 49 in connection with the lever 43, yet I do not wish to be understood as limiting myself thereto, inasmuch as it is obvious that the lever 43 might itself be provided with an angular lug similar to 50 to engage in front of the enlargement 39', and the upper end of said lever 43 could be extended above the bearing-eye for the bolt 44 in order to provide a handle. The arm 49 therefore merely forms a continuation of the lever 43 and serves as a convenient means for swinging the lever on its pivot.

The forward extremity of the shaft 12 is formed with a crank 53. Secured to the horizontal member of the angular casting 9 is a bed-plate 54, and projecting from this bed-plate are two upwardly-extending slotted posts 55 55, the upper ends of the slots being covered by cap-pieces 56 56. The numeral 57 indicates a reciprocating slide, said slide having reduced ends which are adapted to pass through the slots of the posts 55 and to be guided therein. At a medial point this slide is provided with an upwardly-projecting lug 58, provided with an opening through which the crank 53 of the shaft 12 passes. On its outer face the slide has pivoted thereto a dog 59, which is adapted to successively engage with the teeth of the index-wheel. This dog is normally held to engagement with the teeth of the wheel by spring 60.

By reference to Fig. 3 it will be seen that the shaft 30 near its outer end is provided with a shoulder 62 and the pointer 36 bears directly against this shoulder. The pointer is held to revolution with the shaft 30 by means of a nut 63 in the form of a hand-wheel turning on the threaded extremity of the shaft against the pointer.

In the operation of my invention it is desired to weigh, say, two hundred and twenty pounds of milk or other fluid. The pointer is turned until it points to the "220" mark on the index-wheel. As this pointer is thus turned the shaft is also necessarily turned and with it the collar 39, the arm 40 of said collar being thereby brought to a certain position against the edge of the hub 37 of the index-wheel, said index-wheel and its hub of course remaining stationary. The antifriction-roller 41 at the end of the arm 40 of course lessens to a great extent the friction between the edge of the hub and the arm. After the pointer is thus set the lever 24 is operated in order to open the slide or gate valve through the medium of the valve-rod. That is to say, as said lever is swung outwardly the valve-rod and its valve are carried therewith, the valve passing into the projection 21, so that a clear opening is afforded for the fluid to pass from the reservoir 15 through the coupling 17 into the pipe 18 and thence to a bucket of the fluid-actuated wheel. This actuation of the lever 24 at the same time causes a movement of the arm 25, so as to draw it from the position shown in Fig. 4 to such position as will enable the rear end of the bolt 44 to engage the recess 48 of said arm 25, and thus hold the valve in its open position. The weight of the fluid in this bucket will cause the wheel to turn, and the next bucket will be brought beneath the pipe 18 and likewise fill, and so on successively to cause a continuous rotation of the wheel and consequently of the shaft 12. As the buckets are successively brought to a lowermost position they discharge through the discharge-opening of the casing into the discharge-pipe 19. It will be understood that the machine is located within the creamery, and this discharge-pipe 19 may extend to any suitable or convenient point and, if preferred, may lead to the outside of the creamery to a place where the farmer or dairyman can draw his proper proportion of skim-milk without the necessity of going inside of the creamery. As the shaft 12 is thus actuated the crank on the forward end thereof will cause the reciprocation of the slide 57, and the dog of this slide will be thereby caused to successively act on the teeth of the index-wheel and give to said wheel an intermittent revolution. The moment the wheel has been rotated sufficiently far to bring the recess 38 of the hub 37 into register with the arm 40 said arm is forced into the recess by reason of the force exerted by the coiled spring 46 acting against the lever 43, which lever is thereby turned slightly on its pivot toward the index-wheel. With the turning of the lever 43 the operating-arm 49, which is connected to the lever, is also necessarily turned therewith, so that the lug 50 of said arm offers no obstruction to the collar 39 being forced longitudinally toward the index-wheel by the action of the lever 43 thereagainst to permit of the engagement of the arm 40 with the recess 38 of the hub 37, as just explained. The recess 38 is so positioned that this engagement of the arm 40 with it will occur at the time the index-wheel has been rotated sufficiently to bring the zero-mark of the graduations into register with the pointer. Of course with the turning of the lever on its pivot in the manner just described the bolt 44 is drawn forwardly, so that its rear end is brought out of engagement with the recess 48 of the arm 25. The moment this occurs the coiled spring 28, which encircles the valve-rod 20', will force said valve-rod in a direction to cause the slide-valve to close the opening of the coupling 17 and at the same time carry the arm 25 in the same direction, and when said arm reaches the lug 27 the beveled end thereof will ride up the bevel of the lug, and the free end of the arm 25 will thereby be raised, so as to provide a clear passage for the return of the rear end of the bolt 44 to its normal position. It will therefore be seen that at the time the arm 40 engages with recess 38 of the hub and the pointer reaches the zero-mark of the index-wheel and the valve mechanism and other parts are operated in the manner just described two hundred and twenty pounds of skimmed milk or other fluid will have passed through the discharge-pipe.

In order to again set the machine, all that is necessary to do is to press rearwardly on the upper end of the arm 49, so as by the engagement of the lug 50 with the flange 39' to draw the collar 39 rearwardly and at the same time force the bolt 44 in a similar direction, so that its rear extremity will be in position to engage the recess 48 of the arm 25. As the collar 39 is thus slid rearwardly on the shaft 30 the antifriction-roller of the arm 40 is carried out of the recess 38 and said antifriction-roller again permitted to bear against the edge of the hub of the index-wheel. After again setting the pointer to the proper mark on the scale, when it is desired to measure a further quantity of the fluid the lever 24 is again operated, so as to draw the slide-valve outwardly and also bring the arm 25 to a position to allow the projecting rear end of the bolt 44 to engage the recess 48 of said part.

The reservoir 15 is for the purpose of securing an even pressure at all times. It will be noticed that the pipe 16, leading to the reservoir, is somewhat larger in diameter than the discharge of the reservoir. This therefore will permit the fluid to flow into the reservoir faster than it can flow out of the same, whereby the air in the reservoir above the fluid is compressed and an even pressure thereby always maintained.

What I claim as my invention is—

1. In a machine for weighing liquids, the combination, of a shaft, a fluid-actuated wheel mounted thereon, an index-wheel having a series of graduations on one face thereof, and also provided with a series of teeth extending circumferentially therearound, a pointer adapted to be adjusted to any particular point on the scale of the index-wheel, and a dog carried by the shaft of the fluid-actuated wheel, and adapted to engage the teeth of the index-wheel, and thereby rotate said index-wheel intermittently.

2. In a machine for weighing liquids, the combination, of a shaft, a fluid-actuated wheel mounted thereon, another shaft, an index-wheel mounted loosely on the latter shaft, said wheel having a series of graduations on one face thereof, and adapted to be intermittently rotated by the shaft of the fluid-actuated wheel, a pointer fast on the shaft, and adapted to be adjusted to any particular point on the scale of the index-wheel, valve mechanism for controlling the flow of the fluid to the fluid-actuated wheel, clutch mechanism carried by the shaft of the index-wheel, and intermediate mechanism between the valve and the clutch mechanism, said intermediate mechanism adapted to be operated to hold the valve open, and when a certain amount of the fluid has passed out of the discharge of the fluid-actuated wheel, said intermediate mechanism adapted to automatically close the valve, and to throw the clutch mechanism into engagement with the index-wheel in order to hold said wheel to adjusted position.

3. The combination, of a rotatable shaft having a cranked end, a slide to which the cranked end of the shaft is connected, a dog pivoted to said slide, an index-wheel having a toothed periphery and a series of graduations on its face, the dog of the slide adapted to engage the teeth of the index-wheel and to rotate said wheel intermittently, and a pointer adapted to be adjusted to any particular mark of the index-wheel.

4. The combination, of a shaft, an index-wheel mounted loosely thereon, said wheel provided with a projecting hub having a recess in its periphery, a pointer mounted fast on the shaft, a collar rotatable with and slidable longitudinally on the shaft, said collar provided with an arm or projection adapted normally to bear against the edge of the hub of the index-wheel, and means adapted, after the index-wheel has been rotated a sufficient distance to bring the recess of its hub into register with the projecting arm of the collar, to force said arm into the recess.

5. The combination, of a shaft, an index-wheel mounted loosely thereon, said wheel provided with a projecting hub having a recess in its edge, a pointer fast on the shaft and adjacent to the graduated face of the index-wheel, a collar rotatable with and slidable on the shaft, said collar provided with an arm or projection carrying an antifriction-roller at its end, said collar adapted normally to bear against the edge of the hub of the index-wheel, and means adapted, after the index-wheel has been rotated a sufficient distance to bring the recess of its hub into register with the arm of the collar, to force said arm longitudinally and cause the antifriction-roller thereof to seat itself in the recess of the hub.

6. The combination, of a shaft, an index-wheel mounted loosely thereon, said wheel provided with a projecting hub having a recess in its edge, a pointer mounted fast on the shaft adjacent to the graduated face of the index-wheel, a collar rotatable with and slidable longitudinally on the shaft, said collar provided with an arm or projection, means for normally holding the arm of the collar against the edge of the hub of the index-wheel, means adapted, after the index-wheel has been rotated a sufficient distance to bring the recess of its hub into register with the projecting arm of the collar, for forcing said arm into the recess, and a lever engaging the collar and adapted, when operated, to withdraw the arm of the collar out of engagement with the recess of the hub.

7. The combination, of a shaft, an index-wheel mounted loosely thereon, said wheel provided with a hub having a recess in its edge, a pointer mounted fast on the shaft adjacent to the graduated face of the index-wheel, a collar rotatable with and slidable longitudinally on the shaft, said collar provided with an arm or projection adapted normally to bear against the edge of the hub of the index-wheel, and to be forced into the recess of said hub after the index-wheel has been rotated a certain distance, and a spring-pressed lever engaging the collar.

8. The combination, of a shaft, an index-wheel mounted loosely thereon, said wheel provided with a projecting hub having a recess in its edge, a pointer mounted fast on the shaft adjacent to the graduated face of the index-wheel, a collar rotatable with and slidable longitudinally on the shaft, said collar provided with an arm or projection adapted normally to bear against the edge of the hub of the index-wheel, and to be forced into the recess of said hub, after the index-wheel has been rotated a certain distance, a lever engaging the collar, a bolt projecting from said lever, a valve, and mechanism for operating the valve, said mechanism, when operated so as to open the valve, adapted to be held in locked position by the bolt, when said bolt is forced in one direction by the turning of the lever, the parts being held to this position by the engagement of the arm of the collar with the edge of the hub, and the valve mechanism adapted to automatically close, when said arm is seated in the recess of the hub, and the position of the lever and bolt thereby changed.

9. The combination, of a shaft, an index-wheel mounted loosely thereon, said wheel provided with a projecting hub having a recess in its edge, a pointer mounted fast on the shaft adjacent to the graduated face of the index-wheel, a collar rotatable with and slidable longitudinally on the shaft, said collar provided with an arm or projection adapted normally to bear against the edge of the hub of the index-wheel, and to be forced into the recess of said hub, after the index-wheel has been rotated a certain distance, a lever engaging the collar, a bolt projecting from said lever, a valve, mechanism for operating the valve, an arm carried by the valve-operating mechanism, said arm adapted to be engaged by the bolt, when the arm of the collar bears against the hub of the index-wheel, and to be disengaged therefrom when the arm of the collar passes into the recess of the hub.

10. The combination, of an inlet-pipe, a sliding valve for regulating the same, a valve-rod, an arm carried by the valve-rod, a longitudinally-movable bolt separate from and adapted to engage with and to be disengaged from the arm, and when engaged therewith to hold the valve in an open position, and when disengaged therefrom to permit the valve to assume a closed position, and means for actuating the bolt so as to cause said engagement with and disengagement from the arm.

11. The combination, of an inlet-pipe, a sliding valve for regulating the same, a valve-rod, an operating-lever connected to the valve-rod, an arm carried by the valve-rod, a longitudinally-movable bolt separate from and adapted to engage with and to be disengaged from the arm, and when engaged therewith to hold the valve in an open position, and when disengaged therefrom to permit the valve to assume a closed position, and means for actuating the bolt, so as to cause said engagement with and disengagement from the arm.

12. The combination, of an inlet-pipe, a sliding valve for regulating the same, a spring-encircled valve-rod, an arm carried by the valve-rod, a longitudinally-movable bolt separate from and adapted to be engaged with and to be disengaged from the arm, and when engaged therewith to hold the valve in an open position, and means for actuating the bolt, so as to cause said engagement with and disengagement from the arm.

13. The combination, of an inlet-pipe, a sliding valve for regulating the same, a valve-rod, an arm carried by the valve-rod, a bolt adapted to engage with and to be disengaged from the arm, and when engaged therewith to hold the valve in an open position, means for returning the valve-rod and arm to their normal position upon said arm being released by the bolt, and a lug having a beveled surface over which the beveled end of the arm rides when released by the bolt, whereby the free end of the arm is raised and a clear passage afforded for the passage of the bolt.

14. The combination, of a shaft, an index-wheel mounted loosely thereon and provided with a projecting hub having a recess in its edge, a pointer fast on the shaft and adjacent to the graduated face of the index-wheel, a collar rotatable with and slidable longitudinally on the shaft, said collar provided with a projecting arm adapted to bear against the edge of the hub, a lever adapted to engage with the collar in order to effect its longitudinal movement in one direction, a bolt carried by said lever, an inlet-pipe, a valve for controlling said inlet-pipe, a valve-rod and an arm carried by said valve-rod, said arm adapted to be engaged by the bolt, when the arm of the collar is bearing against the edge of the hub of the index-wheel, and to be disengaged therefrom, when the arm of the collar passes into the recess of said hub.

In testimony whereof I affix my signature in presence of two witnesses.

HENRY H. HUHN.

Witnesses:
LEWIS SOPER,
M. T. COOPER.